United States Patent Office 3,847,895
Patented Nov. 12, 1974

3,847,895
SUBSTITUTED SULFOPHENYL-AZO-NAPHTHYL-AZO-ANILIDE COMPOUNDS
William H. Armento, Albany, N.Y., assignor to GAF Corporation, New York, N.Y.
No Drawing. Filed Sept. 30, 1971, Ser. No. 185,342
Int. Cl. C09b 31/04
U.S. Cl. 260—187
10 Claims

ABSTRACT OF THE DISCLOSURE

There are disclosed novel azo dyes and a process for producing the same which dyes produce bright blue to navy to black dyeings on nitrogenous materials such as wool, silk, leather, polyamides and the like. These dyes are of the following formula:

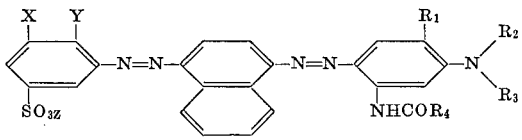

wherein $R_1$ is hydrogen or lower alkoxy, $R_2$ is hydrogen, lower alkyl or lower alkyl substituted by chlorine, bromine, cyano or hydroxy, $R_3$ is lower alkyl or lower alkyl substituted by chlorine, bromine, cyano or hydroxy, $R_4$ is lower alkyl of 1 to about 6 carbon atoms or phenyl, Z is hydrogen or an alkali metal such as sodium, one of X and Y is hydrogen and the other is hydrogen, chlorine, bromine, hydroxy, cyano, lower alkyl or lower alkoxy.

BACKGROUND OF THE INVENTION

Field of the Invention

This invention relates to a novel class of azo dyes useful for dyeing nitrogenous-containing materials in bright blue to navy to black shades.

Description of the Prior Art

It is known to produce diazo dyes by coupling metanilic acid with alpha-naphthylamine, rediazotizing and then coupling with an arylamine which couples para to the amino group. Reactions and products of this type are disclosed for instance in British Pat. No. 1,198,886 wherein products of the following formula are disclosed:

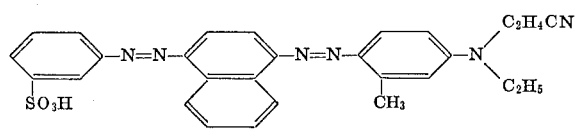

The dyestuffs described in this patent are excellent polyamide dyestuffs for dyeing rubine shades.

In addition, Belgian Pat. No. 739,971 (1770) discloses dyestuffs having the following formula:

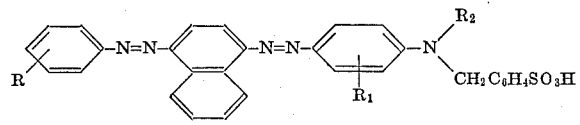

wherein R is hydrogen, chlorine, $CH_3$ or $OCH_3$, $R_1$ is hydrogen or $CH_3$ and $R_2$ is alkyl.

None of these prior art references, however, disclose azo dyes of the type presented herein which are unique in that they contain an amido group and provide unique dyeing properties to the compounds in that they dye nitrogenous containing materials from bright blue to navy blue to black shades. Accordingly, the products of the present invention provide an unexpected advance in the art.

SUMMARY OF THE INVENTION

It is accordingly one object of this invention to provide a novel class of azo dyestuffs.

A further object of this invention is to provide a novel class of azo dyestuffs which are uniquely suited for dyeing nitrogenous containing materials from bright blue to navy to black shades.

A still further object of the invention is to provide methods for preparation of the novel azo dyestuffs as well as methods for dyeing nitrogenous materials and the products resulting therefrom.

Other objects and advantages of the present invention will become apparent as the description thereof proceeds.

In satisfaction of the foregoing objects and advantages there is provided by this invention a novel class of azo dyestuffs which may be characterized by the following formula:

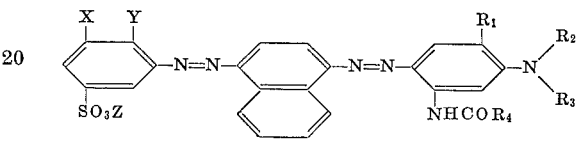

wherein in the above formula $R_1$ is hydrogen or lower alkoxy, $R_2$ is hydrogen, lower alkyl or lower alkyl substituted by chlorine, bromo, cyano or hydroxy, $R_3$ is lower alkyl or lower alkyl substituted by chlorine, bromine, cyano or hydroxy, $R_4$ is lower alkyl of 1 to 6 carbon atoms or phenyl, Z is hydrogen or alkali metal, and one of X and Y is hydrogen and the other is hydrogen, chlorine, bromine, hydroxy, cyano, lower alkyl or lower alkoxy.

Also provided is a method for preparation of these dyestuffs which comprises initially diazotizing metanilic acid and coupling with an equivalent amount of alpha-naphthylamine. This monoazo dye is then rediazotized and coupled with an equivalent amount of the amido-substituted arylamine to provide the final product. There is also provided in accordance with this invention a method for dyeing nitrogenous materials with the novel dyestuffs to provide bright blue to navy blue to black colorings and the products resulting therefrom.

DESCRIPTION OF THE PREFERRED EMBODIMENTS

In accordance with this invention there is provided a novel class of azo dyes as well as a process for producing the same. These dyes have been found to be unique in that they produce bright blue to navy to black dyeings on nitrogenous materials. These dyeings have excellent light fastness and wash fastness and are level dyeing with good build-up. As pointed out, the dyes of this invention dye nitrogenous materials such as wool, silk, leather, polyamides such as nylons, polyurethanes and the like in bright blue to navy to black shades and the resulting dyeings have excellent fastness to washing, light and crocking. The dyes are especially suitable for dyeing nylons or polyamides.

As indicated above, the novel dyestuffs of this invention may be described by the following general formula:

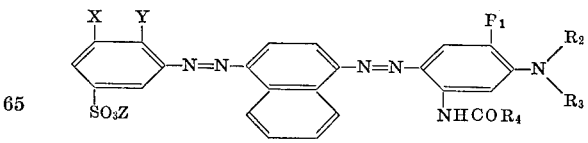

In this formula $R_1$ is hydrogen or lower alkoxy of about 1 to 6 carbon atoms, for example, methoxy, ethoxy, normal-propoxy, isopropoxy and the like; $R_2$ is hydrogen or lower alkyl of 1 to 6 carbon atoms or lower alkyl substituted by chlorine, bromine, cyano or hydroxy, for example $R_2$ may be hydrogen, methyl, ethyl, normal-propyl, chloroethyl, cyanoethyl, bromoethyl and hydroxyethyl. $R_3$ is lower alkyl preferably of 1 to 6 carbon atoms or lower alkyl substituted by chlorine, bromine, cyano or hydroxy. $R_3$ is preferably the same as defined in the definition of $R_2$. $R_4$ is lower alkyl of 1 to 6 carbon atoms or aryl, preferably methyl or phenyl. Z is hydrogen or an alkali metal, e.g. sodium or potassium but preferably sodium. One of X and Y is hydrogen and the other is hydrogen, chlorine, bromine, hydroxy, cyano, lower alkyl of 1 to 6 carbon atoms, such as methyl or ethyl, or lower alkoxy such as methoxy, ethoxy or propoxy.

The dyestuffs of this invention may be produced in the conventional manner utilizing known methods for effecting the formation of diazo compounds and the resulting coupling reaction. Thus, in the first step metanilic acid is diazotized and then coupled with an equivalent amount of alpha-naphthylamine. The diazotization step may be carried out in known manner, for example see U.S. Pat. Nos. 2,099,525, 3,079,377, etc., by reacting the metanilic acid with nitrosyl sulfuric acid or sodium nitrite in a mineral acid such as sulfuric acid or hydrochloric acid at temperatures of about 20–40° C. The resulting diazotized metanilic acid is then coupled with an equivalent amount or up to equivalent excess of 10% by weight of either reactant with alpha-naphthylamine by adding a naphthylamine solution in dilute mineral acid aqueous solution to the diazo solution portionwise over a period of time. The resulting mixture is subsequently alkalized or made basic by addition of a base such as an alkali metal hydroxide, alkali metal carbonate or alkali metal bicarbonate, usually with agitation, to obtain a clear orange solution or slurry.

The mixture is then cooled to a temperature of about 0–10° C. and again diazotized by the addition of the sodium nitrite solution and mineral acid or nitrosyl sulfuric acid to provide the azotized intermediate of the following formula:

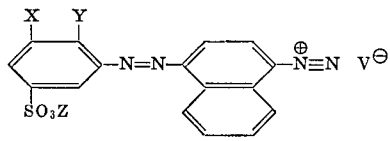

wherein V is the cation of the mineral acid, and Z, X and Y are as defined above.

In the next step of the reaction the above compound is reacted with an amine of the following formula:

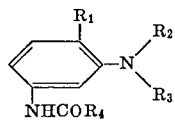

wherein $R_1$, $R_2$, $R_3$ and $R_4$ are as above defined, by dissolving the latter in an aqueous solution containing a small amount of a mineral acid (e.g. HCl, $H_2SO_4$, etc.), cooling to about 0–20° C. and adding the diazo slurry in the appropriate amount as recovered from the preceding step. The reactants may be used in equivalent amounts or up to a 10% equivalent excess of either reactant. The resulting mixture is then agitated to obtain complete reaction and effect the coupling reaction. Thereafter, an alkali bicarbonate/alkali metal acetate solution is added to the coupling reactants and the resulting mixture agitated. Thereafter, the water is decanted off, fresh water and soda ash are added, the mixture is warmed to 75° C., salted with 5% salt solution under slow agitation, cooled to room temperature or about 30° C., separated and air dried. The basic materials are added in this recovery procedure to free the compound from its mineral acid salt and to effect precipitation in ease of recovery.

Each of the steps for diazotation and coupling as set forth above are conducted in the conventional manner and are not presented herewith as being novel per se.

The resulting products recovered from the above series of reactions are uniquely advantageous in that they will dye materials which contain nitrogen, such as nylon, in bright blue to navy to black shades by conventional methods of azo dyeing. The dyeing process may be effected by acidic dyeing, neutral dyeing or wool dyeing when the fiber contains wool. Acidic dyeing is from an aqueous dyebath containing about 0.3 to 0.7% of the unstandardized dye based on the weight of the fiber and about 3–5% of an acid salt, such as ammonium sulfate. The material is then dyed in this solution at or near the boil for about one hour, rinsed and dried. In neutral dyeing the aqueous bath contains about 0.3–0.7% of the dye, 1–3% of a dispersing agent and the pH is about 7. The dyeing process is conducted as in acidic dyeing. In wool dyeing, the aqueous bath contains about 0.3–0.7% of the unstandardized dye, about 10–20%, preferably 15%, of an alkali metal sulfate and 5–8%, preferably 6%, of ammonium sulfate, all amounts being based on the weight of the fiber to be dyed. The dyeing procedure is the same as in acidic dyeing. The wool is dyed a strong reddish blue shade which is fast to light, washing and fulling.

The following list of compounds identify metanilic acid deratives which are preferred starting materials for the compounds of this invention:

metanilic acid
4-chlorometanilic acid
5-chlorometanilic acid
4-bromometanilic acid
5-bromometanilic acid
4-methylmetanilic acid
4-hydroxymetanilic acid
5-hydroxymetanilic acid
4-methoxymetanilic acid
5-methoxymetanilic acid
4-ethoxymetanilic acid
5-propoxymetanilic acid
4-butoxymetanilic acid
4-cyanometanilic acid
5-cyanometanilic acid The following list of compounds exemplify preferred couplers containing the amido group which may be used in the final step of the invention to couple with the rediazotized intermediate. These couplers are as follows:

3′-(methylamino)acetanilide
3′-(ethylamino)acetanilide
3′-(propylamino)acetanilide
3′-(butylamino)acetanilide
3′-(dimethylamino)acetanilide
3′-(diethylamino)acetanilide
3′-(cyanoethylamino)acetanilide
3′-(ethylcyanoethylamino)acetanilide
3′-(chloroethylamino)acetanilide
3′-(hydroxyethylamino)acetanilide
3′-(3-chloro-2-hydroxypropylamino)acetanilide
3′-(diethylamino)propionanilide
3′-(diethylamino)butyranilide
3′-(diethylamino)capricanilide
3′-(diethylamino)benzanilide
3′-(diethylamino)-4-methoxyacetanilide
3′-(diethylamino)-4-ethoxyacetanilide
3′-(diethylamino)-4-propoxyacetanilide
3′-(diethylamino)-4-butoxyacetanilide The following examples are presented to illustrate the invention but it is not to be considered as limited thereto. In the examples and throughout the specification parts are by weight unless otherwise indicated.

EXAMPLE I

Preparation of the dyestuff having the formula:

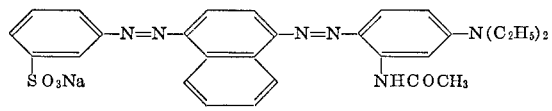

Metanilic acid (34.5 grams) is dissolved in 240 ml. water at 25° C. The solution is iced to 0° C., 42 ml. of hydrochloric acid, 20° Bé., is added followed by the rapid addition of 36 ml. of sodium nitrite solution (31.5%). It is stirred for 20 min. at 5–10° C. and 1.6 grams sodium bicarbonate is added to Congo alkalinity. Then 28.6 grams of 1-naphthylamine flake is dissolved in 280 ml. of water and 20 ml. of hydrochloric acid at 80–85° C. Cold water is then added to 50° C. and 560 ml. volume.

The 1-naphthylamine solution is filtered and added to the diazo solution over a 15 minute period. It is stirred overnight, then alkalized by the addition of 52 ml. sodium hydroxide solution (30% by weight) to a clear orange solution, and iced to 0° C.

To this solution is added 47 ml. sodium nitrite solution and 400 grams of salt. After stirring 15 minutes, 46 ml. of dilute sulfuric acid is added. After stirring at 0–5° C. for 30 minutes, it is allowed to stand 2 hours, then is filtered and washed with a salt solution consisting of 400 ml. water and 40 grams salt at 0° C.

At this point 32 grams of 3'-diethylaminoacetanilide is dissolved in 400 ml. water and 14 ml. dilute sulfuric acid, and then iced to 10° C. To this is then added the rediazo cake from above. It is stirred 30 minutes to a smooth slurry.

A bicarbonate-acetate solution is prepared by dissolving 40 grams sodium bicarbonate and 20 grams sodium acetate in 400 ml. water. Then 50 ml. of this bicarbonate-acetate solution is added to the above coupling solution. After stirring an hour, 10 ml. more is added. After stirring, the water is decanted off, followed by addition of 1 liter of water and 10 grams soda ash. It is warmed to 75° C., salted with 5% salt solution under slow agitation, cooled to 30° C., separated and air dried.

A neutral dyeing on nylon at 0.5% of the unstandardized dye gave a reddish blue shade; an acidified dyeing on nylon, employing ammonium sulfate, gave a somewhat stronger reddish blue shade. There was practically no staining on AATCC wash fastness test #3, with only slight color loss. Light fastness was good. Similarly, heavier dyeings up to 2% of unstandardized dye gave deeper dyeings to pure navy shades with practically complete exhaustion of the dyebatch.

The acidic dyeing was from an aqueous dyebath prepared to contain 0.5% of the unstandardized dye o.w.f. (on the weight of the fiber) and 4% ammonium sulfate o.w.f. A swatch of the nylon was dyed in this solution at or near the boil for one hour, rinsed and dried.

The neutral dyeing was from an aqueous dyebath prepared to contain 0.5% of the unstandardized dye o.w.f., 2% Diazopon SS-837 (commercial dispersing agent) o.w.f., with the pH adjusted to pH 7 employing disodium phosphate. A swatch of the nylon was dyed in this solution at or near the boil for one hour, rinsed and dried.

EXAMPLE II

A total of 39.2 grams of 3'-(N-cyanoethyl-N-ethylamino)-4-methoxyacetanilide is dissolved in 400 ml. water and 14 ml. dilute sulfuric acid, and then iced to 10° C. To this is then added the rediazo cake of Example I. It is stirred 30 minutes to a smooth slurry. The dyestuff is isolated as in Example I.

This dyestuff has the formula:

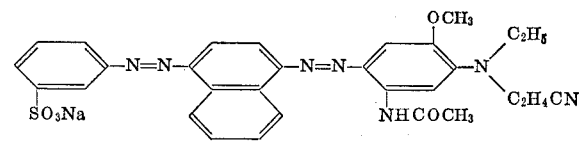

It dyes nylon in a blue shade having excellent fastness properties.

EXAMPLE III

In this example 40 grams of 3'-[Bis(2-hydroxyethyl)amino]-p-acetoanisidide is dissolved in 400 ml. water and 14 ml. dilute sulfuric acid, and then iced to 10° C. To this is then added the rediazo cake of Example I. It is stirred 30 minutes to a smooth slurry. The dyestuff is isolated as in Example I yielding a blue-black dyestuff which has the formula:

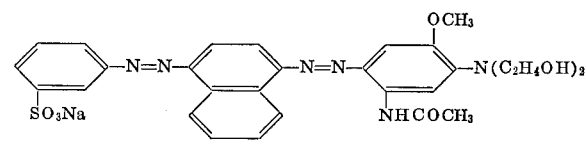

EXAMPLE IV

In this example 42 grams of 3'-(N-chloroethylamino)benzanilide is dissolved in 400 ml. water and 14 ml. dilute sulfuric acid, and then iced to 10° C. To this is then added the rediazo cake of Example I. It is stirred 30 minutes to a smooth slurry. The dyestuff is isolated as in Example I yielding a blue dyestuff which has the formula:

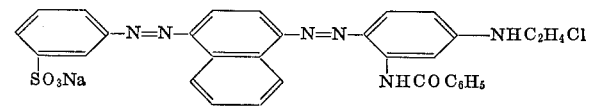

It dyes nylon in a blue shade from a neutral and acid bath. Fastness properties are excellent.

EXAMPLE V

Preparation of the dyestuff having the formula:

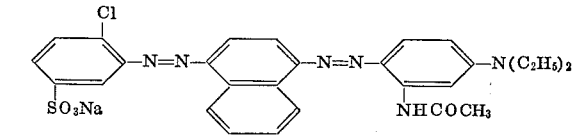

A total of 47.2 grams of 4-chlorometanilic acid is dissolved in 240 ml. of water at 25° C. The solution is iced to 0° C. and 42 ml. of hydrochloric acid, 20° Bé, is added, followed by rapid addition of 36 ml. of sodium nitrite solution (31.5%). It is then stirred for 20 minutes at 5–10° C. and 1.6 grams of sodium bicarbonate is added to Congo alkalinity.

This product is then coupled with 28.6 grams of 1-naphthylamine and rediazotized as in Example I. This rediazo is then coupled with 3'-(diethylamino)acetanilide as in Example I.

The product dyes polyamide fiber in a true navy blue shade with excellent build-up, and having no red flare, even when exposed to UV radiation.

EXAMPLE VI

Preparation of the dyestuff having the formula:

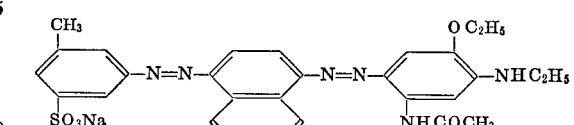

In this example 37.3 grams of 5-methylmetanilic acid is diazotized, coupled with 1-naphthylamine, rediazotized and coupled with 3'-(ethylamino)-4-ethoxyacetanilide according to the method of Example V.

The dyestuff dyes polyamide fiber in an excellent blue black to black shade having excellent build-up, and is free of red flare.

The following dyestuffs were prepared in similar manner.

| Example | Amine | Recoupler | Color |
|---|---|---|---|
| VII | 4-cyanometanilic acid. | 3'-(dimethylamino)-4'-methoxyacetanilide. | Blue-black. |
| VIII | 4-bromometanilic acid. | 3'-(ethylamino)-4'-methoxyacetanilide. | Do. |
| IX | 5-propoxymetanilic acid. | 3'-(diethylamino)-4'-methoxyacetanilide. | Do. |
| X | 4-cyanometanilic acid. | 3'-(diethylamino)acetanilide. | Navy. |
| XI | 4-propoxymetanilic acid. | 3'-(diethylamino)acetanilide. | Do. |

EXAMPLE XII

A total of 38.0 grams of 4-hydroxymetanilic acid is diazotized and coupled with 1-naphthylamine as in Example I. This monoazo intermediate is then rediozatized and coupled with 32 grams of 3'-diethylamoniacetanilide as in Example I. The product thus produced has the formula:

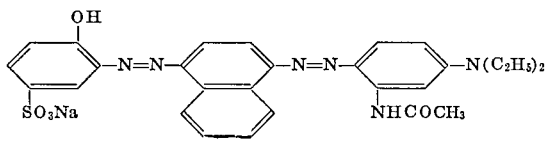

Nylon dyeings produced in the manner of Example I gave a bright navy blue dyeing having good light fastness and wash fastness.

EXAMPLE XIII

A total of 38.0 grams of 4-hydroxymetanilic acid is diazotized and coupled with 1-naphthylamine as in Example I. This monoazo intermediate is then rediazotized and coupled with 36.6 grams of 3'-diethylamino-4'-methoxyacetanilide as in Example I. The product thus produced has the formula:

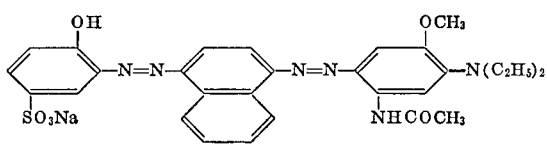

Nylon dyeings produced in the manner of Example I gave an excellent black dyeing which had excellent fastness to light and washing.

The invention has been described herein with reference to certain preferred embodiments. However, as obvious variations thereon will become apparent to those skilled in the art, the invention is not to be considered as limited thereto.

What is claimed is:
1. A compound having the formula:

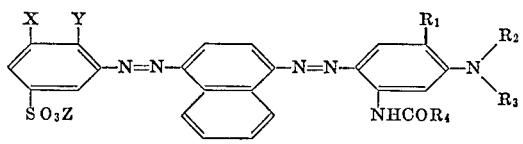

wherein $R_1$ is hydrogen or lower alkoxy; $R_2$ is hydrogen, lower alkyl, chlorolower alkyl, bromolower alkyl, or hydroxylower alkyl; $R_3$ is lower alkyl, chlorolower alkyl, bromolower alkyl, or hydroxylower alkyl; $R_4$ is lower alkyl of 1 to 6 carbon atoms or phenyl; Z is hydrogen or an alkali metal; one of X and Y is hydrogen and the other is hydrogen, chlorine, bromine, hydroxy, cyano, lower alkyl or lower alkoxy.

2. A compound according to claim 1 wherein X and Y are hydrogen and Z is sodium.

3. A sodium salt of an amidophenyl azonaphthyl compound having the formula

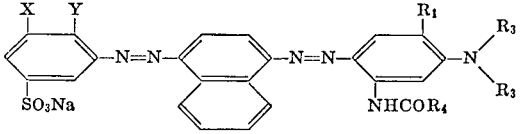

wherein one of X and Y is hydrogen and the other is hydrogen, lower alkyl, lower alkoxy, cyano, hydroxy, chlorine or bromine; $R_1$ is hydrogen or lower alkoxy; each of $R_2$ and $R_3$ is hydrogen lower alkyl, lower alkoxy, lower alkylhydroxy, or lower chloro or bromo alkyl and wherein not more than one of $R_2$ and $R_3$ is hydrogen; and $R_4$ is lower alkyl of 1–6 carbon atoms or phenyl.

4. A compound according to claim 3 wherein X and Y are hydrogen, $R_1$ is hydrogen, $R_2$ and $R_3$ are ethyl and $R_4$ is methyl.

5. A compound according to claim 3 wherein X and Y are hydrogen, $R_1$ is methoxy, $R_2$ and $R_3$ are hydroxyethyl and $R_4$ is methyl.

6. A compound according to claim 3 wherein X and Y are hydrogen, $R_1$ is hydrogen, $R_2$ is hydrogen, $R_3$ is chloroethyl, $R_4$ is phenyl.

7. A compound according to claim 3 wherein X is hydrogen, Y is chlorine, $R_1$ is hydrogen, $R_2$ and $R_3$ are ethyl and $R_4$ is methyl.

8. A compound according to claim 3 wherein X is methyl, Y is hydrogen, $R_1$ is ethoxy, $R_2$ is hydrogen, $R_3$ is ethyl and $R_4$ is methyl.

9. A compound according to claim 3 wherein X is hydrogen, Y is hydroxy, $R_1$ is hydrogen, $R_2$ and $R_3$ are ethyl and $R_4$ is methyl.

10. A compound according to claim 3 wherein X is hydrogen, Y is hydroxy, $R_1$ is methoxy, $R_2$ and $R_3$ are ethyl and $R_4$ is methyl.

References Cited
UNITED STATES PATENTS

| | | | |
|---|---|---|---|
| 3,096,140 | 7/1963 | Gaetani | 260—187 X |
| 3,637,649 | 1/1972 | Meininger et al. | 260—185 X |
| 2,289,413 | 7/1942 | Ellis et al. | 260—187 X |
| 2,391,195 | 12/1945 | McNally et al. | 260—187 |
| 3,359,256 | 12/1967 | Mueller et al. | 260—205 |
| 3,523,936 | 8/1970 | Toji | 260—187 |

LORRAINE A. WEINBERGER, Primary Examiner

C. F. WARREN, Assistant Examiner

U.S. Cl. X.R.

260—196; 8—41 B